United States Patent [19]

Corteville et al.

[11] Patent Number: 4,723,890
[45] Date of Patent: Feb. 9, 1988

[54] ARTICULATED JET PUMP, USABLE MORE PARTICULARLY IN TFL TECHNIQUE FOR ACTIVATING HYDROCARBON OR WATER PRODUCING WELLS

[75] Inventors: Jacques Corteville, Rueil-Malmaison; Frédéric Hoffmann, Courbevoie; André Pauc, Villennes S/Seine, all of France

[73] Assignee: Institut Francais de Petrole, France

[21] Appl. No.: 859,371

[22] Filed: May 5, 1986

[30] Foreign Application Priority Data

May 6, 1985 [FR] France ................. 85 06992

[51] Int. Cl.⁴ .................................. F04F 5/02
[52] U.S. Cl. .................... 417/151; 417/172; 417/198; 403/131
[58] Field of Search ............. 417/151, 172, 178, 181, 417/193, 195, 196, 198; 403/76, 122, 128, 131; 166/105, 372

[56] References Cited

U.S. PATENT DOCUMENTS

| 384,050 | 6/1888 | Martin | 417/198 |
|---|---|---|---|
| 658,516 | 9/1900 | Smith | 403/122 X |
| 2,743,913 | 5/1956 | Gundlach | 417/151 X |
| 2,879,848 | 3/1959 | Drummond | 417/151 X |
| 4,329,124 | 5/1982 | Pridy | 417/545 |
| 4,441,861 | 4/1984 | Canalizo | 417/172 X |
| 4,541,780 | 9/1985 | Moreland | 417/198 X |
| 4,605,069 | 8/1986 | McClaflin et al. | 166/372 X |

Primary Examiner—Carlton R. Croyle
Assistant Examiner—Paul F. Neils
Attorney, Agent, or Firm—Antonelli, Terry & Wands

[57] ABSTRACT

An articulated jet pump is provided usable more particularly in TFL techniques for activating hydrocarbon or water-producing wells. The pump of the invention may be positioned in production tubing by travelling through this tubing as far as the chosen position and comprises a nozzle adapted for being fed with drive fluid, the nozzle having an outlet orifice which cooperates with a mixer-diffuser assembly placed in an extension of the nozzle. The pump is formed from at least two elements articulated together at the level of the mixer.

7 Claims, 4 Drawing Figures

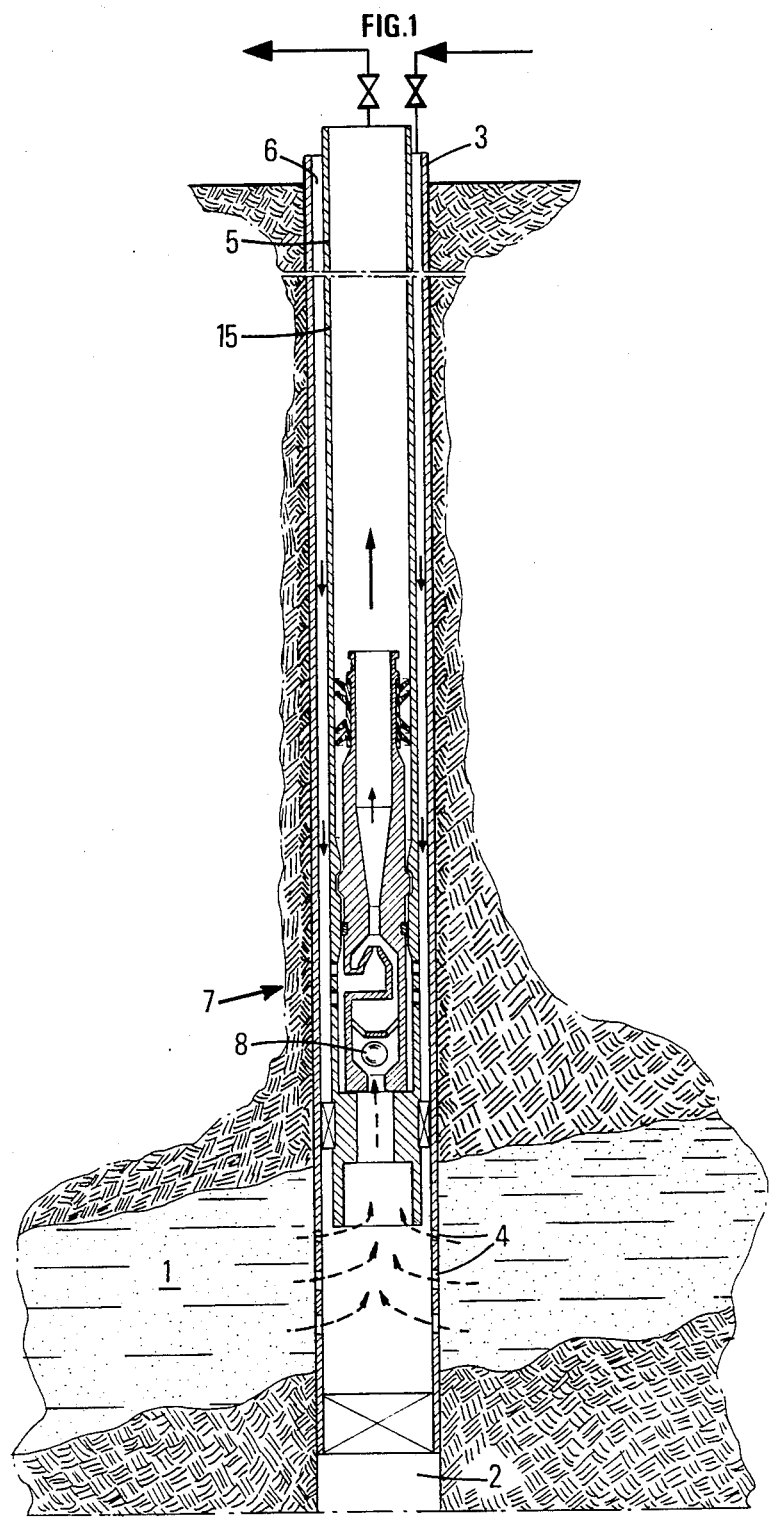

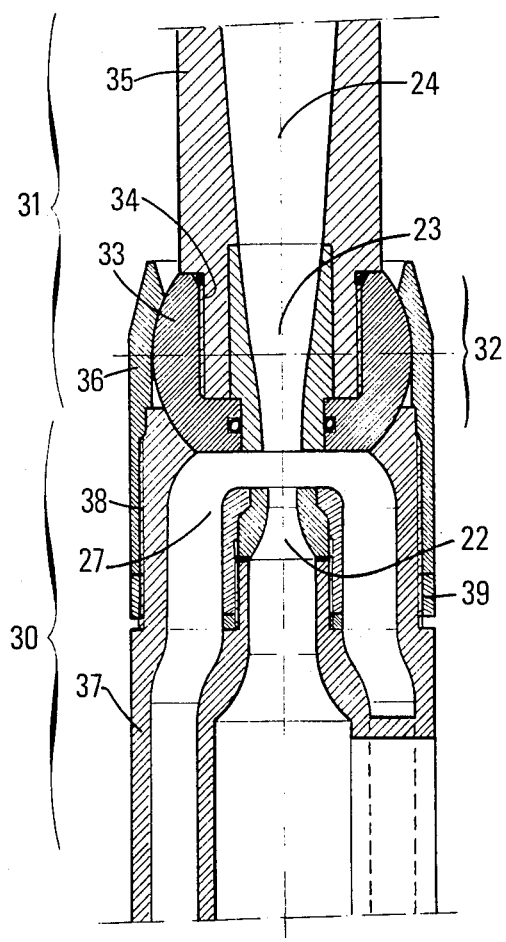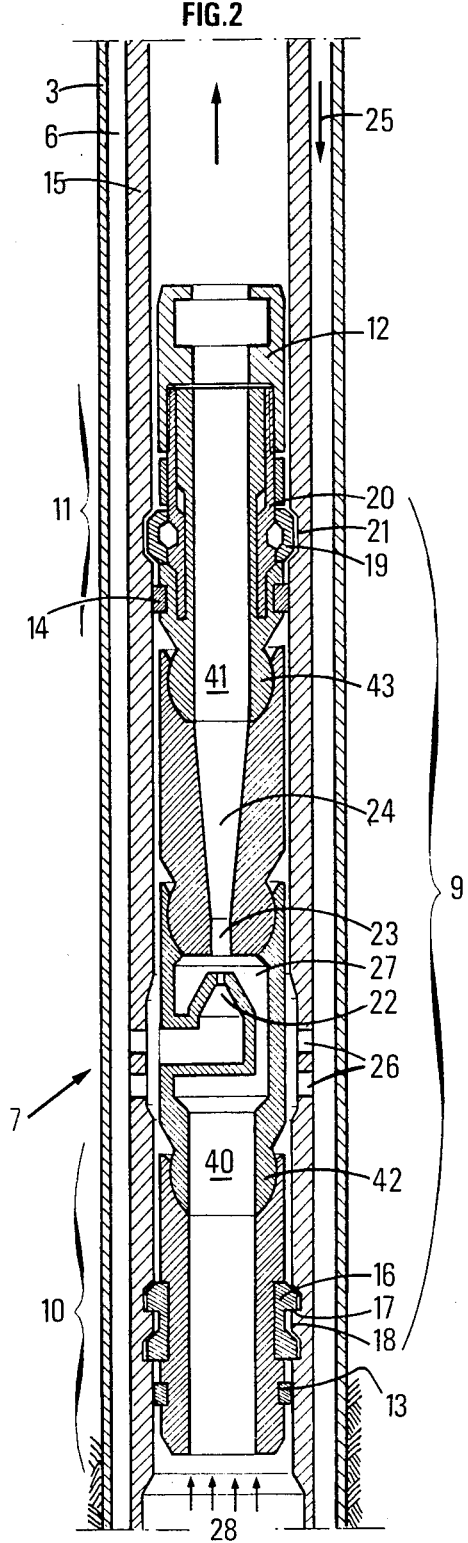

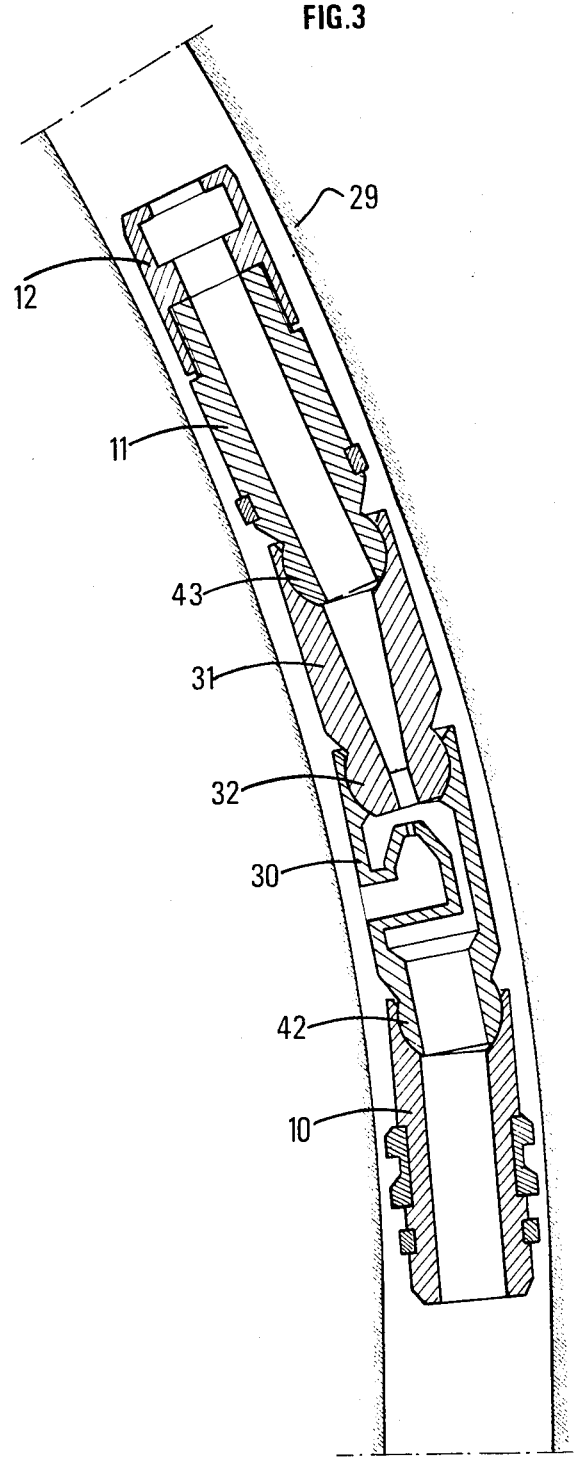

4,723,890

ARTICULATED JET PUMP, USABLE MORE PARTICULARLY IN TFL TECHNIQUE FOR ACTIVATING HYDROCARBON OR WATER PRODUCING WELLS

BACKGROUND OF INVENTION

1. Field of Invention

The present invention relates to the design of a hydraulic jet pump, usable more particularly for activating hydrocarbon or water producing-wells, with positioning and removal of the pump by the technique called TFL (Through flow lines).

The TFL technique allows tools or instruments to travel through the different installations of a well: collecting equipment, well-head, and production tubing. For passing the bottom tools through the well-head, this installation is equipped with a device providing the junction between the flow line and the well. This device, which will be called in the following text "Lyre" since it generally looks like a lyre, consists of a loop of about 3 meters in diameter, for passing from the horizontal (or inclined) position of the collecting line to the vertical position of the well.

So that a tool may travel through the installation, it must be formed of articulated elements whose length is compatible with the radius of curvature (or bending radius) or the lyre (1.5 meters). This length in general does not exceed 0.5 meter.

In underwater production, the TFL technique avoids the operations for introducing and removing tools or instruments at the level of the well-head, which operations require the use of relatively considerable means such, for example, as the equipment of a ship with dynamic positioning. The TFL technique does away with the need for a service ship, the bottom equipment being introduced (and withdrawn) through ducts from the production platform.

The object of the present invention is to adapt the jet pump to the TFL technique, so that this pump may be installed in the well and withdrawn in accordance with this technique.

2. Description of the Prior Art

The British patent No. GB-A 2,107,397 describes a jet pump having a spherical articulation. This articulation is situated at the lower (downstream) end of the pump properly speaking and not in the central and functional part of the pump.

The prior art in this field is also illustrated for example by the following patents: U.S. Pat. No. 3,052,302; British Specification No. 1,533,416 and U.S. Pat. No. 3,781,134.

SUMMARY OF THE INVENTION

The invention overcomes this problem by providing a hydraulic jet pump usable more particularly for activating a hydrocarbon or water producing-well, this pump being positioned in production tubing by travelling through this tube as far as the chosen position and comprising a nozzle adopted for being fed with a drive fluid, said nozzle having an outlet orifice which cooperates with a mixer-diffuser assembly placed in the extension of this nozzle, this pump being further formed from at least two elements articulated together at the level of said mixer.

In an advantageous embodiment, the hydraulic jet pump of the invention comprises a first element containing the diffuser, this element having at one end thereof a spherical articulation surrounding the mixer, and a second element or body surrounding the nozzle and which is has at one end a coupling ring cooperating with said spherical articulation for forming an articulation of the ball joint type.

BRIEF DESCRIPTION OF THE DRAWINGS

The description of the invention refers to the following figures wherein:

FIG. 1 shows schematically the production well with a conventional jet pump;

FIG. 2 shows one embodiment of the articulated jet pump of the present invention;

FIG. 3 illustrates passage of the pump through the lyre at the well-head and;

FIG. 4 shows, in detail, the articulated part of the pump.

DESCRIPTION OF THE PREFERRED EMBODIMENT

In FIG. 1, reference numeral 1 designates a productive geological formation in which a well 2 has been bored. This well is equipped with a casing 3 comprising perforations 4 at the level of the productive layer. The production may be obtained by single or double completion.

In the first place, well 2 is only equipped with a single production tubing 5, which forms with casing 3 an annular space 6 allowing the production. In the case of double completion, a second production tubing replaces the annular space 6.

Production is activated by a jet pump 7. The pump is completed by a standing valve 8 which avoids the return of the production towards the formation 1.

This conventional jet pump has been redesigned in accordance with the invention for being adapted to the TFL technique. It is integrated in an assembly line which is formed, as shown in FIG. 2, of the following different parts:

the jet pump 7,
the locator mandrel 10,
the locking mandrel 11, and
a mandrel 12 for fixing tools for positioning and removing the pump.

The positioning and removal of this pumping equipment is carried out either conventionally, using adapted fitting and recovery tools or using the method described in French patent application No. E.N. 85/02 285, by simply reversing the flow direction of the fluids in the annular space 6 and tubing 15 connected to the production tubing 5.

The locator 10 and locking 11 mandrels are provided with seals 13 and 14 which provide the upstream and downstream sealing of the pump 7.

The bottom assembly 9 is freely installed in the production tubing 15. By "free" assembly is meant here an assembly which may move in the production tubing 15, and which, in operation, is fixed to tubing 15 by the locking mandrel 11. Anchoring is effected when the locator mandrel 10 reaches the desired datum level in well 2. This element 10 is formed of a "key" 16 comprising teeth 17. Recesses 18 with forms complementary to those of teeth 17 are provided in the receiving tubing 15. When pump 7 reaches the desired level, the fitting of teeth 17 into recesses 18 positions the pump. Anchorage is provided at the level of the locking mandrel 11 by blocking "dogs" 19 integral with the sliding sleeves 20 in the corresponding recesses 21, formed in tubing 15.

The jet pump 7 comprises essentially a nozzle 22, over which are mounted a mixer 23 and diffuser 24 assembly. Activation of the production is achieved by injecting at the surface, at 25, a drive fluid into the annular space 6. This fluid penetrates into nozzle 22 through lateral orifices 26 formed in the receiving tubing 15. Restriction of the passage section of the drive fluid through nozzle 22 forms a high speed jet. This jet causes a depression which sucks up the fluid to be pumped at 28 at the base of tubing 15 and drives it through neck 27. The two fluids are recombined in the mixer 23. The diffuser 24 transforms into a dynamic pressure the kinetic energy acquired by the fluids. The gain in pressure thus obtained provides the necessary power for raising the production to the surface.

The different parts of this equipment are articulated to each other so that the assembly may travel in the "lyre" disposed at the well head and a part of which is shown schematically, 29 in FIG. 3.

FIG. 4 shows in detail the articulated part of the jet pump of the invention.

The originality of the invention consists in dividing the pump into at least two parts articulated at the level of the mixer.

In effect, it is apparent that the dimension of the articulated elements which may travel in TFL installations—length limited to 0.5 meter—is not sufficient for containing a jet pump which may ensure the production of high flowrates with suitable energy yields; in particular, the diffuser which is a conical tube with a very small aperture angle, cannot be shortened without loss of yield.

In the considered embodiment, the pump has been divided into two elements 30 and 31. The first element surrounding nozzle 22 and the second element 31 containing a mixer 23 and a diffuser 24. These elements 30, 31 are articulated together by a ball and socket joint 32 which is placed at the level of mixer 23. The articulation is formed of a spherical part 33, fixed by a threaded portion 34 to member 35 comprising the diffuser 24. The mixer 23 is held between the spherical part 33 and the member 35. Connection with the first element 30 of the pump is provided by the coupling ring 36. This ring 36 is fixed to body 37 by the threaded portion 38, and is held in position by the locknut 39.

The suction site 40 and the delivery site 41 of the pump are also connected to the locator 10 and anchoring 11 mandrels by ball joints 42 and 43 of the same type (FIG. 2).

According to the invention, articulation 32 is placed at the level of mixer 23 rather than in the diffuser part of the pump. Thus, since there exists no direct mechanical contact between nozzle 22 and mixer 23, damages which may occur during travel of bottom equipment in the installations does not affect the essential parts of the pump, namely the nozzle, the mixer and the diffuser.

Furthermore, at this position, small defects of alignment or adjustment have no appreciable influences on the performances of the pump.

Furthermore, such localization of articulation 32 allows nozzle 22 and, if required, the mixer 23-diffuser 24 assembly to be replaced very easily. However, depending on the size of the pump, it is possible to dispose additional articulations at other points of the pump, for example at the outlet of the mixer.

With the invention, the optimum dimensions of the different parts of the pump, especially of the diffuser, are kept. It facilitates the travel of the pump through installations and maintains the performances thereof.

What is claimed is:

1. A hydraulic jet pump usable for activating a hydrocarbon or water producing well, said pump being positioned in a production tubing by travelling through said tubing as far as a chosen position and comprising a nozzle adapted for being supplied with a drive fluid, said nozzle having an outlet orifice which cooperates with an assembly comprising a mixer and a diffuser, said assembly being placed in an extension of said nozzle and said pump being formed of at least two elements articulated together at the level of said mixer.

2. A hydraulic jet pump according to claim 1, wherein said assembly of said mixer and diffuser is located in one element, said one element having an end which is articulated to another element of said pump and which is at the level of an outlet of said diffuser.

3. A hydraulic jet pump according to claim 2, wherein said another element includes means for anchoring the pump to a sidewall of the production tubing.

4. A hydraulic jet pump according to claim 1, wherein a first element of said at least two elements contains the diffuser, an end of said first element having a spherical articulation surrounding the mixer and a second element of said at least two elements surrounding the nozzle, said second element having at one end a coupling ring cooperating with said spherical articulation to form a ball and socket type articulation therebetween.

5. A hydraulic jet pump according to claim 4, wherein said second element has another end spaced from said nozzle through which a fluid to be produced is drawn into said nozzle and then discharged into said assembly.

6. A hydraulic jet pump according to claim 4, wherein said second element has another end spaced from said nozzle through which a fluid to be produced is drawn into said nozzle and then discharged through said assembly; said another end having a spherical articulation surrounding an inlet passage and being coupled to a third element.

7. A hydraulic jet pump according to claim 6, wherein said first element has another end spaced from said mixer through which a produced fluid is discharged, said another end having a coupling ring cooperating with a spherical articulation of a fourth element; said fourth element having means for locking the pump to a sidewall of the production tubing.

* * * * *